Figure 1:
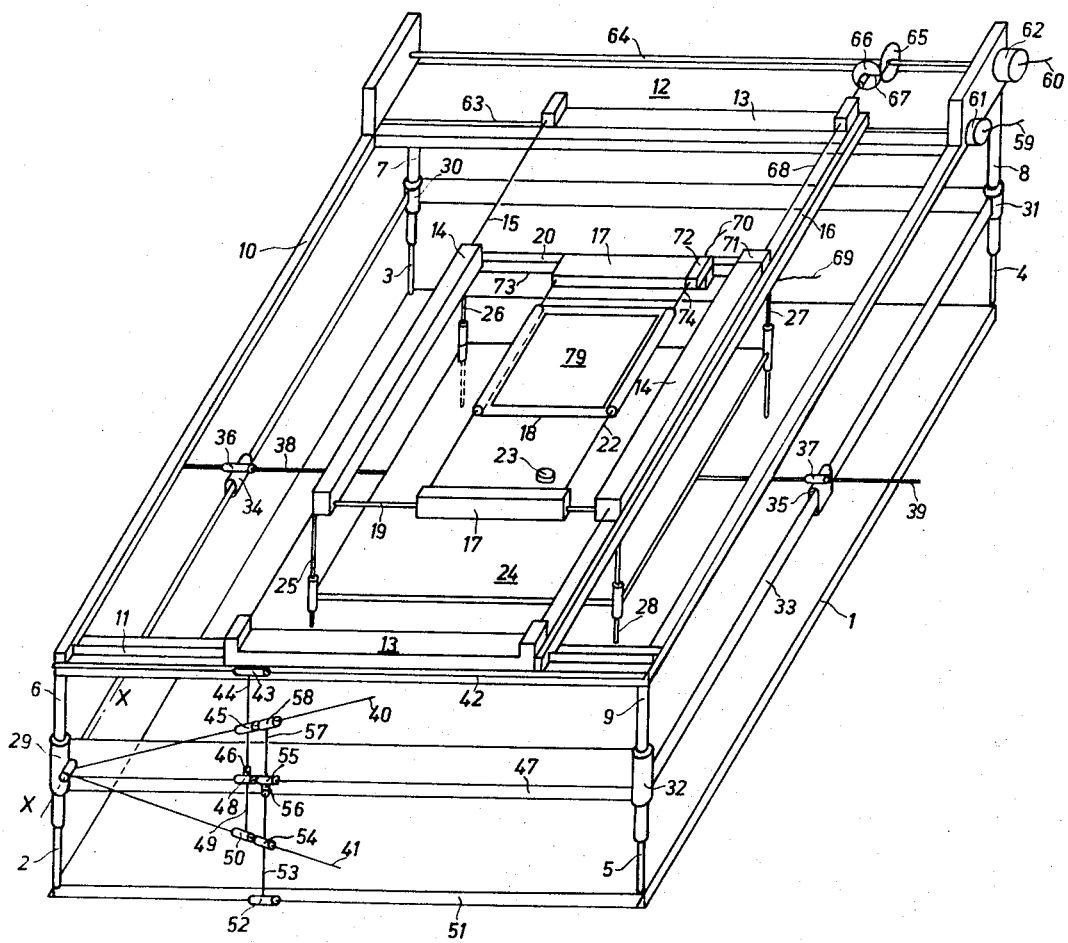

June 20, 1967 H. SCHOELER ET AL 3,326,080
DIFFERENTIAL AEROPHOTOGRAM RECTIFIERS
Filed May 21, 1964 3 Sheets-Sheet 2

Inventors
Horst Schoeler
Otto Schribaufs
Horst Hartwig
Alexander Heyroth

United States Patent Office 3,326,080
Patented June 20, 1967

3,326,080
DIFFERENTIAL AEROPHOTOGRAM RECTIFIERS
Horst Schoeler, Otto Weibrecht, Horst Hartwig, and Alexander Heyroth, Jena, Gera, Germany, assignors to VEB Carl Zeiss Jena, Jena, Germany
Filed May 21, 1964, Ser. No. 369,330
4 Claims. (Cl. 88—24)

This invention relates to differential aerophotogram rectifiers which are coupled to photogrammetric plotters and comprise an image carrier, a projection surface and a projection objective, the image carrier and the projection surface being at right angles to the optical axis of the projection objective and displaceable relatively to each other.

Making accurate aerophotographic plans depends on the photograms being freed from influences due to image inclination and height differences in the landscape and on the central perspective aerophotographs being changed to orthographic ones. To this end the photograms placed in the photogrammetric plotter are scanned strip by strip, the profile of each strip is formed and a slit successively projects at least one of the photograms on a photographic layer.

It is a known practice to couple differential photogram rectifiers to photogrammetric plotters working on the principle of optic projection. The photograms, oriented as at the time of exposure, are rectified in a purely optical manner, which means that the magnification ratio (image distance to subject distance) depends only on the heights of the various profile points, but that in the plotter and projection apparatus every focal length must be dealt with by a projector of the same focal length and the same angular aperture, exact affinity plotting being therefore impossible.

Another known differential rectifier is coupled to a plotter working on the principle of mechanical projection. In the rectification of photograms placed horizontally in the plotter, the magnification ratio of the rectification is determined by the profile heights of the strips and by a constant factor which is equal to the effective focal length of the plotter. This other known rectifier, though ensuring exact affinity plotting, is inexact in differential rectification because in the rectification process the inherently inclined photograms are treated as vertical photographs, so that the noticeable inaccuracies of the rectification increase in proportion to the increase of the nadir distance of the photograph.

The said differential rectifiers are comparatively simple in construction, but can be coupled only to plotters of special construction.

It is an object of the present invention to provide a differential photogram rectifier which, on the one hand, connects with any photogrammetric plotter offering for obliquely taken photographs a camera constant changing from image element to image element, and which, on the other hand, is extremely simple in construction in that it can do without automatic vanishing-point control and without an automatic control fulfilling the Scheimpflug condition. The rectifier according to the invention guarantees exact rectification independent of nadir ditsance.

The invention is based onthe knowledge that a photogram taken at any nadir distance can be automatically transformed to a vertical photograph, and that this vertical photograph can be magnified at a ratio which is constant in the differential range only.

The rectifier according to the invention has an inversor which on the one hand carries the lens equation into practice in a manner known per se and on the other hand controls the relation of image to projection as a function of the photographic focal length, the nadir distance and the point coordinates of at least one photogram in the photogrammetric plotter.

Accordingly, the inversor realizes the lens equation $$\frac{1}{a}+\frac{1}{a'}=\frac{1}{f}$$

in consideration of the scale factor $$v=\frac{z}{c''_k}$$

wherein $$c''_k=(c_k\cdot\cos\varphi-x'\cdot\sin\varphi)\cdot\cos\omega-y'\cdot\sin\omega$$

In these equations, $a$ is the distance apart of image plane and front nodal point of objective,
$a'$ is the distance apart of projection surface and rear nodal point of objective,
$f$ is the focal length of the objective,
$c''_k$ is the instantaneous camera constant,
$c_k$ is the constant of the taking camera,
$x'$ and $y'$ are the image coordinates of a point,
$z$ is a coordinate (height) of the subject distance, and
$\varphi$ and $\omega$ are the components of the nadir distance.

The height $z$ of the projection centre of the photograph and the instantaneous camera constant $c''_k$ are formed in the plotter and passed to the rectifier according to the invention.

Whether a mechanical, an electrical or a mechanico-electrical inversor is used, depends on the construction and/or the particular use to be made of the rectifier.

An inversor of the mechanical kind is made up of a guide for two rods which are parallel to each other and at right angles to the guide and the displacements of which in the guide are controlled by the plotter, the one rod changing the subject distance and the other rod changing the image distance, and two rocker arms rotatable about an axis X—X which are linked to the two rods and intersect with the guide at a point in the axis X—X, the distances of the linkage point of the one arm at the one rod and of the linkage point of the other arm at the other rod from the guide being changeable, and the distances of the linkage point of the one arm at the other rod and of the linkage point of the other arm at the one rod from the guide being constant The guide can be displaceable at right angles to itself.

An electric inversor can comprise two electromotors for changing the image and projection distances and two respective calculating bridges which control the motors according to the values to be fed into the plotter.

A partly electrical and partly mechanical inversor has advantageously only one motor, which over a lever system changes the ratio image to projection and simultaneously balances out a calculating bridge branched to the plotter and controlling the motor. Inversors of this kind are particularly simple, compact and inexpensive, combining as they do the advantages of purely mechanical and purely electric systems without the inherent disadvantages.

It is immaterial for the mode of operation of the differential rectifier according to the invention whether the objective is stationary and the image carrier and the projection table are displaceable along the three space coordinates, or whether the projection table is stationary and the projection objective and the image carrier are displaceable, or whether the image carrier and the projection table move in parallel planes, the objective is stationary and the optical path length between image carrier and projection table can be changed by suitable displaceable optics. In a further embodiment of the invention, the spooled up emulsion carrier passes over a projection table which has a breadth corresponding approximately to the greatest possible slit length and which together with the spools is displaceable parallel to the spool axes, whereas the objective and the slit are stationary. This further embodiment can be a self-contained or an auxiliary apparatus.

Figure 2:
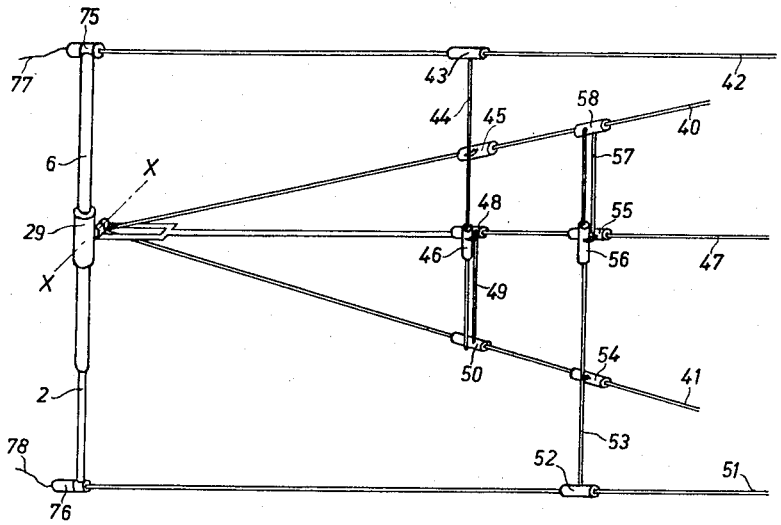
Figure 3:
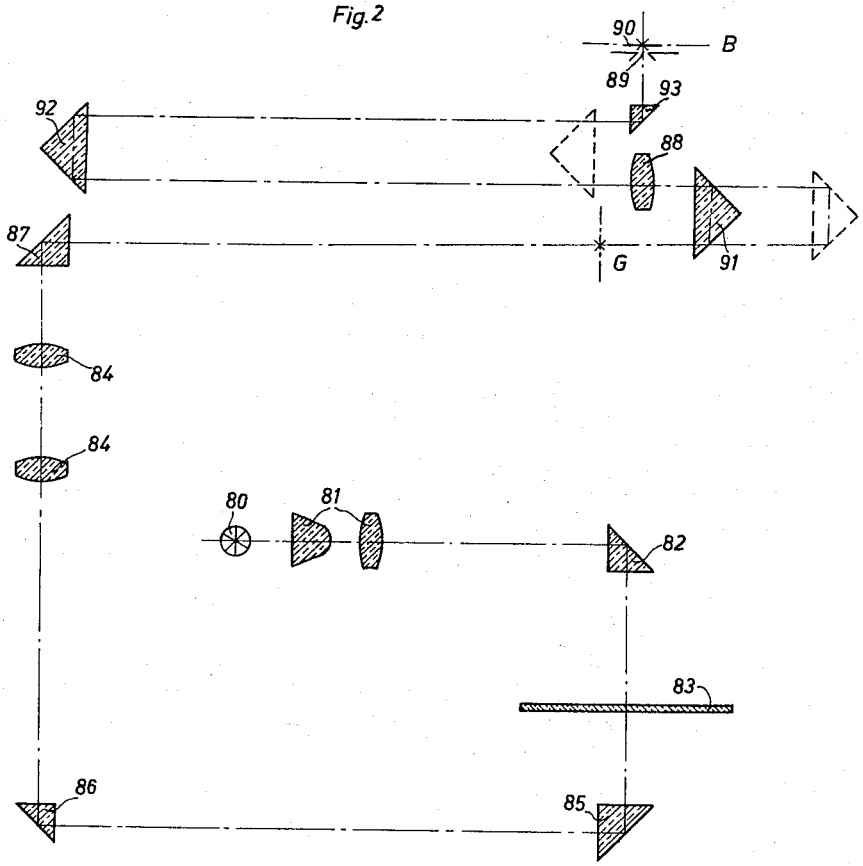
Figure 4:
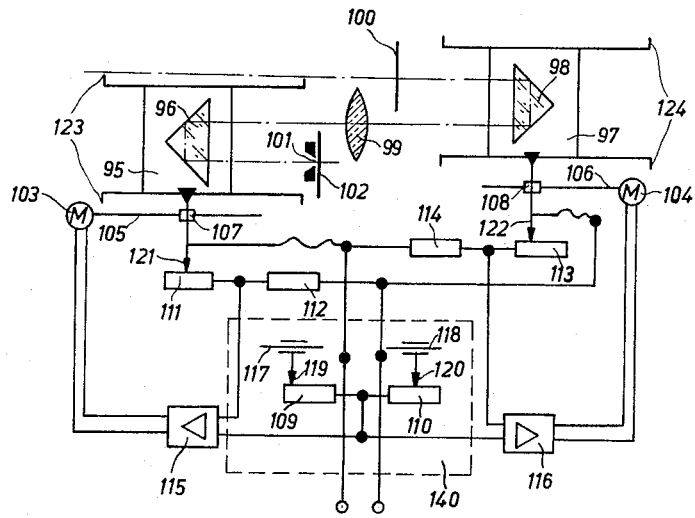
Figure 5:
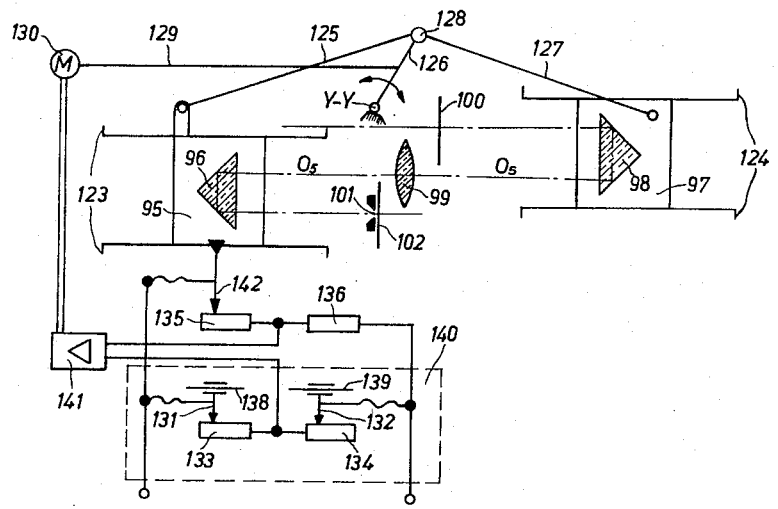

In order that the invention may be more readily understood, reference is made to the accompanying drawings which illustrate diagrammatically and by way of example two embodiments thereof, and in which FIG. 1 is a perspective view of the one embodiment of a differential photogram rectifier, FIG. 2 shows the respective inversor on a larger scale, FIG. 3 shows the optical arrangement of the other embodiment of a differential photogram rectifier, and FIGS. 4 and 5 show two kinds of inversors.

In FIG. 1, the four corners of a base plate 1 support four vertical rods 2, 3, 4 and 5 along which glide respectively four cylinders 6, 7, 8 and 9 fast with the four corners of a first frame 10. The first frame 10 has two guides 11 and 12 for a slide 13. On the slide 13 a slide 14 glides along two guide rods 15 and 16 which are at right angles to the direction of displacement of the slide 13. The slide 14 carries a system of cross slides 17 and 18. The slide 17 is displaceable along two guide rods 19 and 20 and carries the slide 18, which is displaceable along a guide rod 21 and a spindle 22. A plate 24 carrying an objective 23 is displaceable at right angles to the planes of the cross slides 17 and 18, along guides 25, 26, 27 and 28 fixed to the slide 14 and parallel to the rods 2, 3, 4, and 5. A second frame 33 between the base plate 1 and the first frame 10 is displaceable by means of sliders 29, 30, 31, 32 along the cylinders 6, 7, 8, 9, and is connected to the plate 24 and the objective 23 by means of two carriers 34 and 35 of two guides 36 and 37 in which glide respectively rods 38 and 39 fast with the plate 24.

The second frame 33 holds two arms 40 and 41 rocking about an axis X—X in planes which are at right angles to the planes of displacement of the cross slides 17, 18 and parallel to the direction of displacement of the slide 13. By means of a nut 43 (FIG. 2), a rod 44 at right angles to the first frame 10 can be displaced along a spindle 42 fast with the first frame 10. To the rod 44 is connected a slider 45 which is displaceable along the rocker arm 40 and is from the nut 43 at a distance equal to the focal length of the objective 23. The rod 44 glides in a guide 46 rigidly connected to a slide 48. The slide 48 glides along a guide 47 which is fast with the frame 33 and parallel to the spindle 42. To the slide 48 is fixed the one end of a rod 49 which is parallel to the rod 44. To the other end of the rod 49 is connected a slider 50 which is displaceable along the rocker arm 41 and is from the slide 48 at a distance equal to the focal length of the objective 23. On the base plate 1 is a spindle 51 which is parallel to the guide 47 and together with the spindle 42 lies in a vertical plane. Along the spindle 51 is displaceable a nut 52 fast with the vertical rod 53. To the rod 53 is rotatably connected a slider 54 which is displaceable along the rocker arm 41 and is from the nut 52 at a distance equal to the focal length of the objective 23. A slider 56 fast with a slide 55 is displaceable along the rod 53. The slide 55 which is displaceable along the guide 47, as is the slide 48, is fast with the one end of a vertical rod 57. To the other end of the rod 57 is linked a slider 58 which is displaceable along the rocker arm 40 and is from the slide 55 at a distance equal to the focal length of the objective 23.

The spindles of a plotting device (not shown) serve for measuring the horizontal model coordinates and control the displacements of the slides 13 and 14 (FIG. 1) by way of electric transmitters (not shown), transmission channels 59 and 60 and receivers 61 and 62 disposed on the upper frame 10, this control corresponding to the coordinates $x$ and $y$ of the subject distance (model coordinates). The receiver 61 actuates a spindle 63 which is mounted in the frame 10 and is in mesh with the slide 13. To the receiver 62 is connected a square rod 64 which over bevel wheels 65, 66 and a driver 67 operates a spindle 68 at right angles to the rod 64. The spindle 68 is mounted in the slide 13 and is in mesh with the slide 14.

The slides 17 and 18 are displaced according to the image coordinates $x'$ and $y'$ of a stereo image placed in the plotter. To this end the image coordinates reduced in the horizontal plane are transmitted by the respective spindles of the plotter (not shown) and by way of electric transmitters, transmission channels 69, 70 and receivers 71 and 72 mounted on the slides 14 and 17 to spindles 73 and 74 which mesh with the slides 17 and 18, respectively.

For displacement of the slides 48 and 55 and accordingly the rods 44, 49 and 53, 57 along the guide 47, the spindles 42 and 51 mounted respectively on the frame 10 and the base plate 1 are actuated by electric receivers 75 and 76 (FIG. 2) which are connected to the plotter (not shown) by means of transmission channels 77 and 78, the slide 55 being displaced according to the coordinate $z$ of the subject distance and the slide 48 according to the instantaneous camera constant $c''_k$. In consequence thereof, the distances of the sliders 45 and 54 from the respective slides 48 and 55 are changed, which means that the frame 33 and the sliders 29, 30, 31, 32 are displaced along the cylinders 6, 7, 8, 9 and the frame 10 by its cylinders 6, 7, 8, 9 along the rods 2, 3, 4, 5. The distance apart of the projection objective 23 and the base plate 1, i.e., the projection plane, and the distance apart from the projection objective 23 and the slide 18, i.e., the image carrier, are changed according to the lens equation and the magnification ratio of image and projection, so as to satisfy the conditions of differential rectification.

By means of a light source (not shown) a photogram 79 on the slide 16 is partially imaged on the surface of the base plate 1, i.e., the projection plane, the image being rectified throughout.

Whereas in the embodiment according to FIG. 1 and 2, the distances between the image plane and the central plane of the objective and between this central plane and the projection plane can be changed, the image and the projection plane in the embodiment FIG. 3 are only displaceable in their planes, parallel to each other. A construction of this latter kind makes it possible for the rectifier according to the invention to be used as a supplementary apparatus of a plotter.

A beam emitted by a light source 80 through a binary condenser 81 to the hypothenuse surface of a right-angled prism 82 for reflection, illuminates part of a photogram 83 disposed in the focal plane of a doublet 84. Two right-angled prisms 85 and 86 deviate the ray path between photogram and objective. After deflection of the ray path by a right-angled prism 87, the doublet 84 images the illuminated part of the photogram 83 in the subject plane G of an objective 88—the rectification objective proper—whose image plane B coincides with the projection surface 90, which is partly exposed by a slit 89. Between the subject plane G and the image plane B, i.e., the projection plane 90, the imaging ray path passes through the rectification objective 88 and is deflected by a prism 91 or 92 and the hypothenuse surface of a right-angled prism 93.

The prisms 91 and 92 are displaceable along the respective ray paths, these displacements being controlled by means of an inversor as represented in FIG. 1 and 2 or as described hereinafter.

In FIG. 4, 95 is the support of a prism 96, 97 is the support of a prism 98, 99 is an objective, 100 a photogram, and 101 a slit in front of a projection surface 102. Displacement of the supports 95 and 97 in guides 123 and 124, respectively, is effected by motors 103 and 104 over spindles 105 and 106 and nuts 107 and 108 connected to the supports. The motors 103 and 104 are controlled by two calculating bridges having potentiometers 109 and 110 in common as well as by potentiometers 111 and 112 of the one bridge and 113 and 114 of the other bridge and by two amplifiers 115 and 116. The potentiometers 109 and 110 by means of spindles 117 and 118 for displacing contacts 119 and 120 are connected to the plotter 140, the contact 119 transmitting to the measuring bridges the z coordinate (height) of the subject distance (model space) and the contact 120 the instantaneous camera constant $c''_k$. When the contacts 119 and 120 change their positions, the calculating bridges carry currents which actuate the motors 103 and 104 over the amplifiers 115 and 116, so that contacts 121 and 122 fast with the nuts 107 and 108, respectively, are displaced along the potentiometers 111 and 113 until there is no more bridge current, the prisms 96 and 98 being moved into positions guaranteeing sharp imaging and the correct scale ratio of projection and image.

FIG. 5 shows an inversor working on the electromechanical principle. The prisms are again designated 96 and 98, the prism carriers 95 and 97, the objective 99, the photogram 100, the slit 101 and the projection surface 102. A double push-crank mechanism with arms 125, 126 and 127 interconnected by a joint 128, the arm 126 being rotatable about a stationary axis Y—Y and the arms 125 and 127 being articulated respectively to the prism carriers 95 and 97, is actuated by a motor 130, which by means of a push-and-pull rod 129 operates the arm 126, so that the carrier 95 and prism 96 and the carrier 97 and prism 98 are displaced in guides 123 and 124 in the same sense, in the direction of the optical axis $O_5$—$O_5$ of the objective 99. The axis of rotation Y—Y of the arm 126, which is a one-arm lever, and the points of connection of the arms 125, 127 at the prism carriers 95, 97 are all in one plane.

The two prism carriers 95 and 97 being displaced by only one motor 130, this motor can be controlled by a calculating bridge having only four potentiometers 133, 134, 135 and 136. The potentiometer 133 is connected by a contact 131 to the z spindle 138, and the potentiometer 134 is connected by a contact 132 to the $c''_k$ spindle 139 of the potter 140. A change of the values z and $c''_k$ in the plotter is automatically followed up by a displacement of the contacts 131 and 132 of the potentiometers 133 and 134, which means that the balance of the resistances in the branches of the bridge is disturbed, bridge current being produced which over an amplifier 141 causes the motor 130 to run in the proper direction. The motor 130 displacing as well the prism carrier 95 and, accordingly, a contact 142 which is fast with the carrier 95 and slides on the potentiometer 135, the resistances of the branches of the bridge are balanced and there is no bridge current any more. At this moment the motor is disconnected.

The prisms in FIGS. 4 and 5 can be replaced by an image plane and/or a projection plane.

We claim:

1. A differential areophotogram rectifier comprising a light source, an image carrier, a projection objective, a projection table, a slit in close proximity to said projection table, the optical axis of said projection objective being at right angles to said image carrier and said projection table, said image carrier and said projection objective and said slit and said projection table being displaceable relatively to each other along said optical axis and at right angles thereto, two cross-slide systems for motions of said image carrier and said projection objective and said slit and said projection table relatively to each other and at right angles to said optical axis, each slide of said cross-slide systems being connected to a measuring spindle of a stereoplotter, a first means for connecting the one of said cross-slide systems to the measuring spindles of the stereoplotter which serve for measuring the horizontal model coordinates, a second means for connecting the other of said cross-slide systems to the measuring spindles of the stereoplotter which serve for measuring the image coordinates, guides parallel to said optical axis for the relative motions of said image carrier and said projection objective and said projection table, and an inversor for varying the optical path between said projection objective and said image plane and for varying the optical path between said projection objective and said projection plane, said inversor consisting of at least one guide connected to said projection objective, two slides displaceable along said guide, a third means for connecting said two slides to the stereoplotter, the one of said slides being displaceable according to the magnitude of the change of the vertical model coordinate in the stereoplotter, the other of said slides being displaceable according to the magnitude of the change of the instantaneous camera constant obtained in the stereoplotter, two rods displaceable on said slide along their axes and at right angles to said guide, the one of said rods being connected to a fourth means for varying the optical path between said projection objective and said image carrier, the other of said rods being connected to a fifth means for varying the optical path between said projection objective and said image carrier, and two rocker arms rotatable about an axis intersecting said guide at right angles, each of said rocker arms being linked to each of said rods, the distances of the linkage point of the one of said rocker arms at the one of said rods and of the linkage point of the other of said other rocker arms at the other of said other rods from said straight guide being variable, and the distances of the linkage point of the one of said rocker arms at the other of said rods and of the linkage point of the other of said rocker arms at the one of said rods from said straight guide being constant.

2. A differential aerophotogram rectifier comprising a light source, an image carrier, a projection objective, a projection table, a slit in close proximity to said projection table, the optical axis of said projection objective being at right angles to said image carrier and said projection table, said image carrier and said projection table being displaceable at right angles to said optical axis, two optical elements disposed in the projection ray path for displacement along said optical axis and effecting a reflection by 180° and a parallel displacement of the projection ray path, said two optical elements disposed on either side of said projection objective, two cross-slide systems for motions of said image carrier and said projection objective and said slit and said projection table relatively to each other and at right angles to said optical axis, each slide of said cross-slide systems being connected to a measuring spindle of a stereoplotter, a first means for connecting the one of said cross-slide systems to the measuring spindles of the stereoplotter which serve for measuring the horizontal model coordinates, a second means for connecting the other of said cross-slide systems to the measuring spindles of the stereoplotter which serve for measuring the image coordinates, guides parallel to said optical axis for the relative motions of said image carrier and said projection table, and an inversor for varying the optical path between said projection objective and said image plane and for varying the optical path between said projection objective and said projection plane, said inversor consisting of at least one guide connected to said projection objective, two slides displaceable along said guide, a third means for connecting said two slides to the stereoplotter, the one of said slides being displaceable according to the magnitude of the change of the vertical model coordinate in the stereoplotter, the other of said slides being displaceable according to the magnitude of the change of the instantaneous camera constant obtained in the stereoplotter, two rods displaceable on said slide along their axes and at right angles to said guide, the one of said rods being connected to that of said optical elements which lies between said image carrier and said projection objective, the other of said two rods being connected to that of said optical elements which lies between said projection objective and said projection table, and two rocker arms rotatable about an axis intersecting said guide at right angles, each of said rocker arms being linked to each of said rods, the distances of the linkage point of the one of said rocker arms at the one of said rods and of the linkage point of the other of said other rocker arms at the other of said other rods from said straight guide being variable, and the distances of the linkage point of the one of said rocker arms at the other of said rods and of the linkage point of the other of said rocker arms at the one of said rods from said straight guide being constant.

3. A differential aerophotogram rectifier comprising a light source, an image carrier, a projection objective, a projection table, a slit in close proximity to said projection table, the optical axis of said projection objective being at right angles to said image carrier and said projection table, said image carrier and said projection objective and said slit and said projection table being displaceable relatively to each other along said optical axis and at right angles thereto, two cross-slide systems for motions of said image carrier and said projection objective and said slit and said projection table relatively to each other and at right angles to said optical axis, each slide of said cross-slide systems being connected to a measuring spindle of a stereoplotter, a first means for connecting the one of said cross-slide systems to the measuring spindles of the stereoplotter which serve for measuring the horizontal model coordinates, a second means for connecting the other of said cross-slide systems to the measuring spindles of the stereoplotter which serve for measuring the image coordinates, guides parallel to said optical axis for the relative motions of said image carrier and said projection objective and said projection table, and an inversor for varying the optical path between said projection objective and said image plane and for varying the optical path between said projection objective and said projection plane, said inversor consisting of two electric bridge connections with three resistances each, two contacts for each bridge connection being linked to two of said three resistances, the one of said contacts in the one of said bridge connections being connected to that spindle of the stereoplotter which serves for measuring the model-height differences, the other of said contacts of said first bridge connection being connected to a third means for varying the optical path between said projection objective and said image carrier, the one of said contacts of said other bridge connection being connected to that spindle of said stereoplotter which supplies the instantaneous camera constant, the other of said contacts of said other bridge connection being connected to a fourth means for varying the optical path between said projection objective and said projection table, two electromotors operating said second contacts of each of said connections when there is a bridge current, and in each current circuit an amplifier between said bridge connection and said electromotor.

4. A differential aerophotogram rectifier comprising a light source, an image carrier, a projection objective, a projection table, a slit in close proximity to said projection table, the optical axis of said projection objective being at right angles to said image carrier and said projection table, said image carrier and said projection objective and said slit and said projection table being displaceable relatively to each other along said optical axis and at right angles thereto, two cross-slide systems for motions of said image carrier and said projection objective and said slit and said projection table relatively to each other and at right angles to said optical axis, each slide of said cross-slide systems being connected to a measuring spindle of a stereoplotter, a first means for connecting the one of said cross-slide systems to the measuring spindles of the stereoplotter which serve for measuring the horizontal model coordinates, a second means for connecting the other of said cross-slide systems to the measuring spindles of the stereoplotter which serve for measuring the image coordinates, guides parallel to said optical axis for the relative motions of said image carrier and said projection objective and said projection table, and an inversor for varying the optical path between said projection objective and said image plane and for varying the optical path between said projection objective and said projection plane, said inversor consisting of a lever system comprising a one-arm lever and two rocker arms, said lever being rotatable about a stationary axis and linked to those ends of said two rocker-arms which are coordinated to each other, a third means for varying the optical path between said projection objective and said image carrier, the other end of the one of said two rocker arms being linked to a third means, a fourth means for varying the optical path between said projection objective and said projection table, the other end of the other of said two rocker arms being linked to said fourth means, the linkage points of said rocker arms at said means and said stationary axis lying all in one plane, a push-and-pull rod connected at one end to said lever, an electric bridge connection having four resistances, three contacts, the first of said contacts being connected to that spindle of the stereoplotter which measures the model-height differences, the second of said contacts being connected to that spindle of the stereoplotter which supplies the instantaneous camera constant, the third of said contacts being connected to said fourth means for varying the optical path between said projection objective and said projection table, an electromotor operating said push-and-pull rod, and an amplifier in the electric circuit between said bridge connection and said electromotor.

No references cited.

NORTON ANSHER, *Primary Examiner.*

R. A. WINTERCORN, *Assistant Examiner.*